United States Patent [19]

Auriol et al.

[11] Patent Number: 5,082,411

[45] Date of Patent: Jan. 21, 1992

[54] FASTENING MEANS SUCH AS A RIVET, ASSEMBLY PROCESS AND ASSEMBLY OBTAINED

[75] Inventors: Jean-Marc Auriol; Philippe Bornes, both of Flourens, France

[73] Assignee: Ste. Ateliers de la Haute Garronne Ets Auriol Cie, Balma, France

[21] Appl. No.: 640,384

[22] PCT Filed: Jul. 12, 1989

[86] PCT No.: PCT/FR89/00373

§ 371 Date: Jan. 22, 1991

§ 102(e) Date: Jan. 22, 1991

[87] PCT Pub. No.: WO90/01121

PCT Pub. Date: Feb. 8, 1990

[30] Foreign Application Priority Data

Jul. 22, 1988 [FR] France .................... 88 10040

[51] Int. Cl.⁵ .................... F16B 19/06; B21D 39/00
[52] U.S. Cl. .................... 411/506; 411/507; 29/524.1; 29/525.2
[58] Field of Search ............... 411/504, 505, 506, 507; 29/509, 524.1, 525.2

[56] References Cited

U.S. PATENT DOCUMENTS

| | | | |
|---|---|---|---|
| 4,051,592 | 10/1977 | Briles | 29/509 |
| 4,086,839 | 5/1978 | Briles | 411/507 |
| 4,159,666 | 7/1979 | Briles | 411/507 |
| 4,695,213 | 9/1987 | Sparling et al. | 411/506 |

Primary Examiner—Neill R. Wilson
Attorney, Agent, or Firm—Harold H. Dutton, Jr.

[57] ABSTRACT

The invention relates to a fastener member for the production of assemblies, in particular a rivet. This fastener means includes a shank (1) and a head (2) intended to be deformed by flattening during installation. On its front face, this head has an annular groove (5) extending around the axis and positioned in proximity to the alignment of the exterior surface of the shank. This groove defines on the head two portions, one central (2C), the other peripheral (2P), able to be deformed independently under the effect of flattening. The invention enables a considerable improvement of the distribution of compressive forces between the fastener means and the materials to be assembled. It assures a satisfactory radial expansion of the head, as well as a sufficient flow of material toward the shank and the junction zone between shank and head.

14 Claims, 3 Drawing Sheets

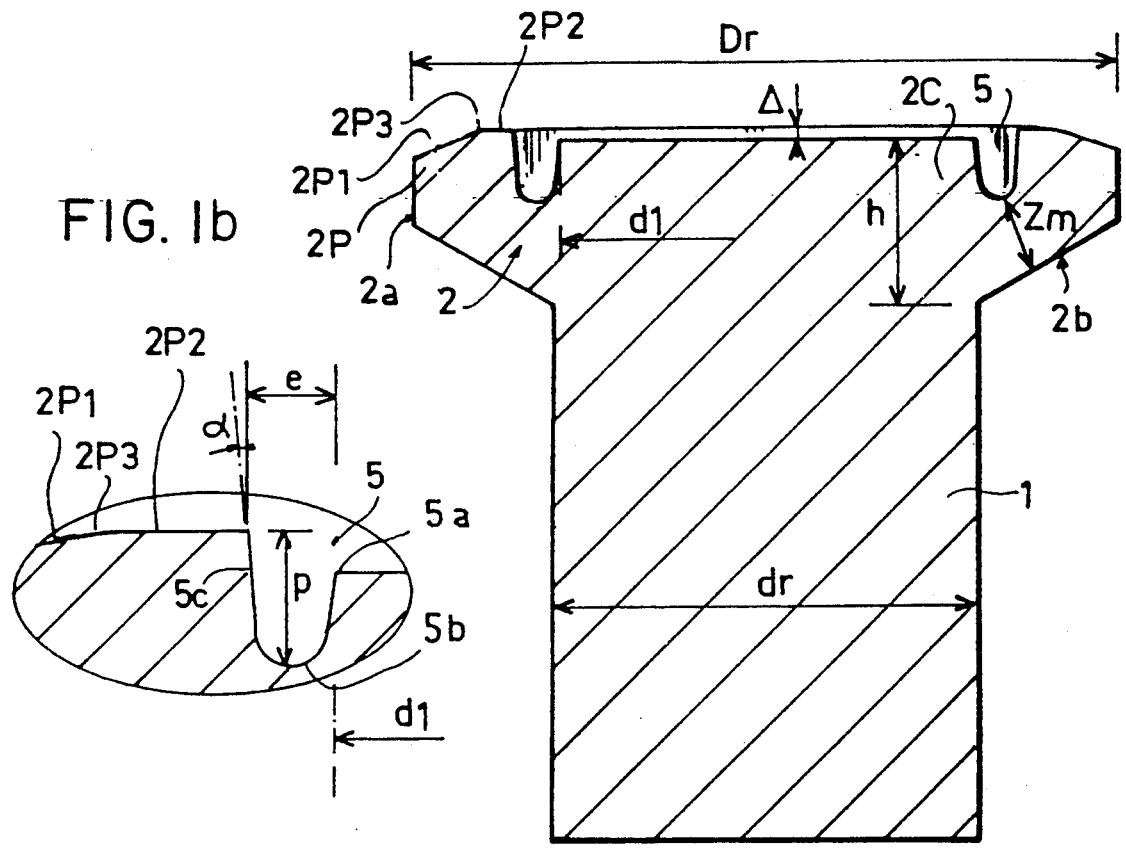
FIG. 1a
FIG. 1b
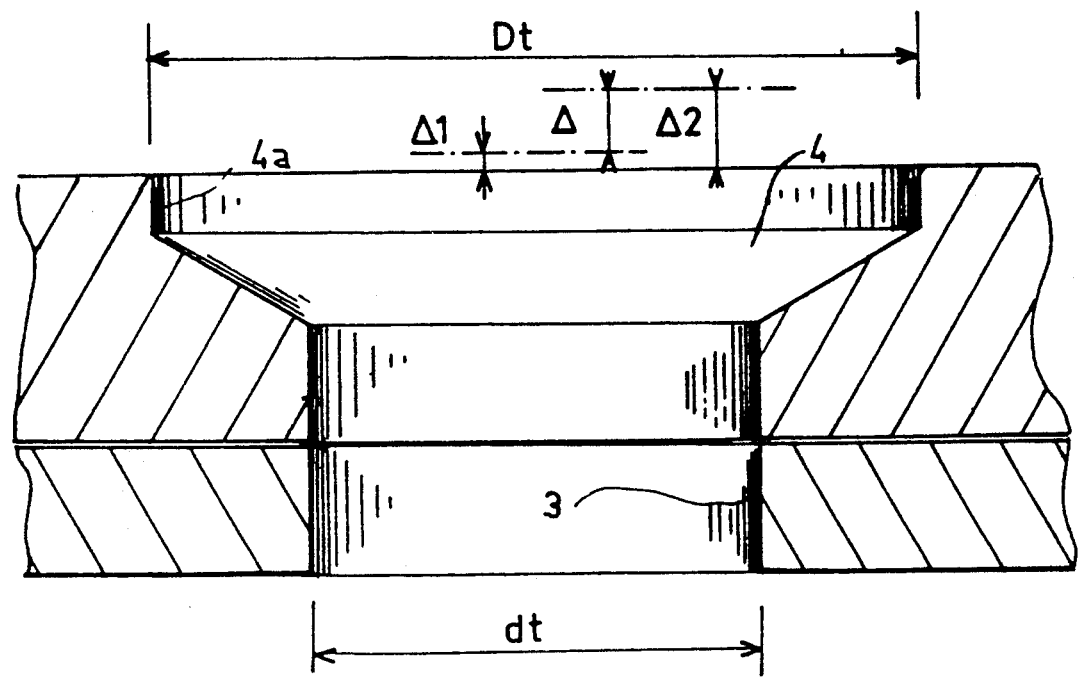
FIG. 2

FASTENING MEANS SUCH AS A RIVET, ASSEMBLY PROCESS AND ASSEMBLY OBTAINED

This invention relates to a fastening means, in particular a rivet, for the assembly of materials, more specifically sheet metal in the aeronautic field It extends to the process for installing the fastening means and to the assemblies obtained. The invention seeks to improve the distribution of compression forces between the securing means and the assembled materials.

BACKGROUND AND OBJECTS OF THE INVENTION

In the aeronautical field, assemblies are required to undergo great stress and it is known that their stress-bearing capacity is directly linked to the distribution of compressive forces which are introduced at the time of installation, between the fastener means and the materials being assembled. The most critical zones are found at the level of the preformed head of the securing means and at the junction between the shank and the head The poorly-solved problem at the present time is that of obtaining, simultaneously, on the one hand a sufficient radial enlargement of the head to guarantee a good tightness between the head and the assembled materials, and on the other hand, a deformation and adequate expansion of the head toward the head/shank junction zone as well as in the shank in order to attain in these zones a higher level of compression restraints, thus assuring a satisfactory stress-bearing capacity.

In attempting to resolve this problem the head of the rivet has been provided with particular shapes, this head being flattened at the time of setting, for producing a flow of the material toward the sheets to be assembled; the adopted solutions heretofore have consisted of adding in projection on the frontal face of the head of the rivet protuberances or bulged parts which are then flattened at the time of placement and produce a greater flow than a flat head. Nevertheless, the shapes provided have a tendency to favor either the radial enlargement of the head to the detriment of the expansion at the level of the head/shank junction and of the shank, or in the reverse, the flow toward the shank to the detriment of the expansion of the head.

Thus certain fastener means are provided with a head having a bulged frontal surface (series of Dassault Standards 3.507.2 and 3.507.3 of 1968; 3.502.1 of 1966; FIAT Standards Norms 12830 of Feb. 5, 1971 intended for the MRCA aircraft; U.S. Pat. Nos. 4,000,680, 3,927,458, 3,747,467, 3,748,948) and the flattening of this bulged head increases the flow toward the shank, improving the compression forces therein; however, with the normal flattening forces, this surplus of material in the central portion of the head tends to reduce the radial enlargement of said head and to bring about a poor tightness between the head and the sheets. Other securing members include a head on which the surplus of material is provided on the periphery of the frontal surface of the head, in particular in the form of an annular projecting dome on this frontal surface (U.S. Pat. No. 4,051,592). During setting, this peripheral projection favors the radial enlargement of the head, bringing about a good tightness of the head in the sheets, however it is to the detriment of the flow toward the shank where the compression constraints remain weak, with the risk of rupture in the case of alternated constraints.

DESCRIPTION OF THE INVENTION

The present invention seeks to provide a satisfactory solution to the problem posed, by providing an improved fastening means adapted to improve the distribution of compressive forces between the fastening means and the assembled materials.

For this purpose, the fastening member provided by this invention is of the type including an axial shank intended to be placed in a hole in the materials to be assembled, and a head situated at one extremity of said shank and intended to be deformed by crushing during setting; according to the present invention, this member is characterized by the fact that its head has a frontal surface on which is provided a ring-shaped groove extending about the axis, said annular groove being essentially positioned on said front face in proximity to the alignment of the exterior surface of the shank and being such as to define on the head, two portions, a central portion and a peripheral portion, able to be deformed indepently under the effect of the flattening.

By "groove essentially positioned in proximity to the alignment of the exterior surface of the shank", it is meant that the groove may be displaced in relation to this exterior surface of the shank by a distance of up to approximately one-third the diameter of the shank.

Thus, instead of providing for excess material projecting from the front face as with known techniques, the invention, by way of the aforementioned groove, accomplishes a separation of this head into two portions which will be distorted independently during flattening: the central portion is the seat of a flow causing the creation of compression forces in the zone of the junction between the shank and head and in the shank, while the peripheral portion conditions the radial enlargement of the head. In this way, it is possible in each application to obtain simultaneously the desired radial enlargement of the head and the central flow necessary to create the desired level of compression forces in the shank.

The fastening means provided by this invention may in particular comprise a rivet in which the flattening of the aforesaid head (preformed head) will be carried out at the time of placement and at the same time as the formation of the second head. In a known manner, this rivet is preferably a countersunk rivet having a cylindrical rim, intended to be inserted during placement into a hole having a complementarily shaped surface.

According to a preferred embodiment, the head of the rivet is produced such that the frontal surface has two levels, one corresponding to the central portion (centripital side in relation to the groove), the other corresponding to the peripheral portion (centrifugal side in relation to the groove). Each of these levels is provided to project beyond surface of the materials to be assembled, by a distance which will assure satisfactorily upon flattening, on the one hand the central flow toward the shank/head junction and toward the shank (level corresponding to the central portion), on the other hand, the enlargement (essentially radial) of the head (level corresponding to the peripheral portion). In particular in the case of a light alloy rivet intended for the assembly of light alloy metal sheets, the level of the central portion may be sunken in relation to that of the peripheral portion in order that the flattening first affects the peripheral zone and will be of greater amplitude for this peripheral zone.

The invention extends to a materials assembly process by means of a rivet such as the one described above.

This process is of the type comprising providing a hole in the materials, formed by a bore opening on one side by a rim, introducing into the hole a rivet comprising, on the one hand, a head having a cylindrical rim, adapted to be housed in the rim of the hole, on the other hand an axial shank adapted to be set in the bore and to extend beyond the opposite side of the head, and flattening said head, while forming at the other end of the shank of the rivet a second head; the process according to the present invention is characterized by:

introducing into the hole, a rivet the head of which has a front face provided with an annular groove positioned in proximity to the alignment of the exterior surface of the shank so as to define in said head a central portion and a peripheral portion, able to be deformed independently, flattening the head by pressure on the front face in such a manner as to cause, on the one hand, the peripheral portion to expand in the rim, and on the other hand, the central portion to be deformed toward the junction zone between shank and head and toward the shank, and to compress in these zones the materials to be assembled.

Moreover, the invention extends to the assemblies produced by the putting this process into practice, in particular to assemblies of sheet metal in the aeronautical field; these assemblies are characterized by a distribution of compressive forces between rivet and materials, such that they pass a maximum amount of compressive forces through the junction zone between shank and head of the rivet, while maintaining a positive value over the entire height of the head.

DESCRIPTION OF THE DRAWINGS

Other characteristics, objects, and advantages of the invention will become apparent from the following description with reference to the accompanying drawings which show by way of non-limiting example, one embodiment of a rivet according to the invention, illustrate the assembly process by means of said rivet, and show the assembly obtained and the distribution of compression forces; in these drawings which are an integral part of the present description:

FIG. 1a–b is an axial cross-section of a rivet according to the invention,

FIG. 1b is an enlarged, fragmentary sectional view of a portion of the head of the rivet of the head of the rivet of FIG. 1a;

FIG. 2 is a cross-section of perforated metal sheets in order to be assembled by means of said rivet.

DETAILED DESCRIPTION OF PREFERRED EMBODIMENTS

Figure 3:
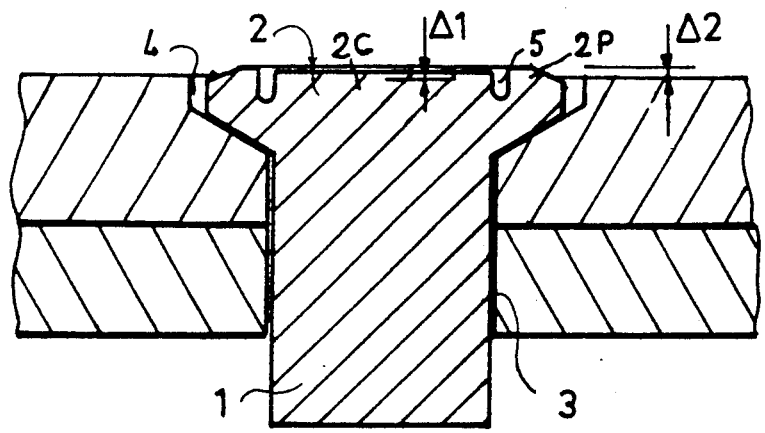
FIGS. 3, 4, and 5 illustrate the phases of the assembly process.

The rivet according to the invention, shown by way of example in FIG. 1, is of an aluminum alloy and is intended to achieve an assembly of metal sheets also of aluminum alloy.

This rivet includes a cylindrical shank 1 which extends along its axis and a head 2 of a greater diameter, situated at one end of the shank. The rivet is intended to be introduced into a hole provided in the metal sheets to be assembled (FIG. 2), which is provided with a cylindrical bore 3 in which the shank 1 is to be positioned, and on one side of which is a recess 4 in which head 2 is to be placed.

The cylindrical shank 1 of the rivet has a diameter $-d_r-$ less than the diameter $-d_{r'}-$ of the bore 3 of the hole in such a manner as to condition a clearance at the most equal to 0.1 mm between shank and bore. The length of shank 1 is adjusted such that it extends beyond the metal sheets on the opposite side of head 2.

This head 2 is a countersunk head having a cylindrical rim 2a and a tapered portion 2b of which the angle of taper may, in a known manner, be equal to 120° (angle at the peak).

The countersink portion 4 of the hole has a similar angle so as to receive said conical part 2b, and opens onto the surface of the metal sheets by a wall 4a.

The cylindrical rim 2a of the head has a diameter $-D_r-$ less than that of the wall 4a of the hole $-D_{r'}-$ in such a manner as to establish a clearance at most equal to 0.5 mm between head and wall.

Furthermore, the front face of the head of the rivet is provided with an annular groove 5 which is arranged approximately in the alignment of the exterior surface of the shank 1. In the example, the inner ridge 5a of this groove is situated on a circumference of a diameter $-d_1-$ such as $d_1 = d_r \pm 0.3\ d_r$.

This groove 5 has a bottom 5b of a semi-circular cross-section and sides 5c opening at a slight relief angle toward the front face; by "slight relief angle" is meant an opening angle approximately on the order of 3°.

The width $-e-$ of the groove 5 is not a critical value and could be provided, in practical use, between $0.08\ d_r$ and $0.12\ d_r$.

The groove 5 defines, between its bottom 5b and the base of the head 2, a zone of reduced thickness $Z_m$ which defines a central portion of head 2C located toward the axis, and a peripheral portion 2P located on the other side. Depth $-p-$ of the groove with respect to the height $-h-$ of the head is adjusted in such way that, under the effect of a flattening pressure on the head, the deformations of the central portion 2C and the peripheral portion 2P are independent (or only slightly related). In the example of a light aluminum alloy rivet, the ratio of $p/h$ can be between 0.1 and 0.5, particularly on the order of 0.3.

In addition, the front face of head 2 is flat in its central portion 2C, the level of this portion being lower than that of the peripheral portion 2P; this peripheral portion is of the raised half-flat type including a rising portion $2P_1$ extending and connected to a flat portion $2P_2$ by a fillet $2P_3$.

The difference $\Delta$ in heights between the recessed central portion 2C and the peripheral portion 2P (half-flat) essentially comprises, in the example, between 0.05 mm and 0.2 mm. Moreover, (FIGS. 2 and 3) the level of the central portion 2C is provided in such a manner as to exceed by a distance $\Delta_1$, the surface of the metal sheets and the level of the peripheral portion by a distance $\Delta_2$, such that:

$0.2\ \text{mm} \leq \Delta_2 \leq 0.4\ \text{mm}$ and $0.05\ \text{mm} \leq \Delta_2 - \Delta_1 = \Delta \leq 0.2\ \text{mm}.$ By way of example, the following values give good results for an aluminum alloy (2017 or 2117) rivet of diameter $-d_r-$ on the order of 4 mm having a head of diameter $-D_r-$ on the order of 6.5 mm:

$\Delta_1 = 0.2$ mm, $\Delta_2 = 0.4$ mm.

Figure 4:
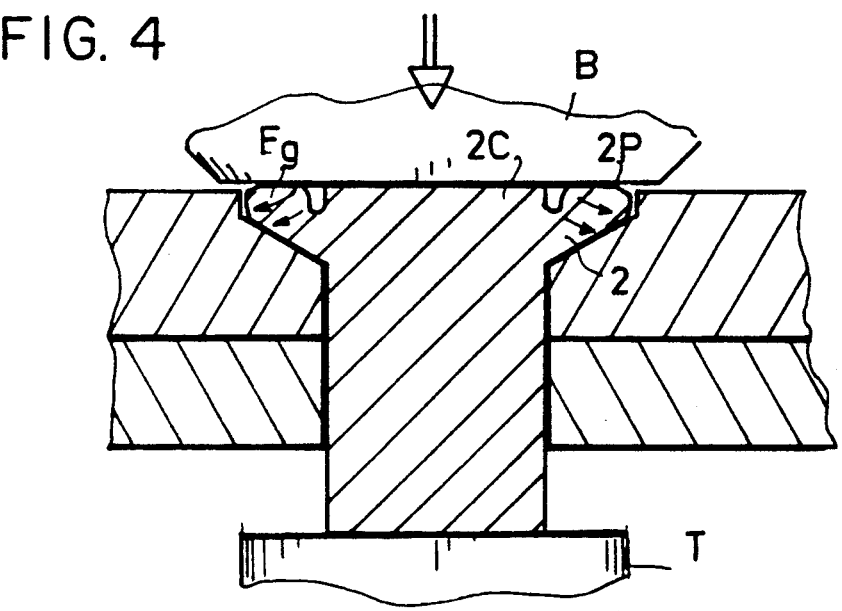
Figure 5:
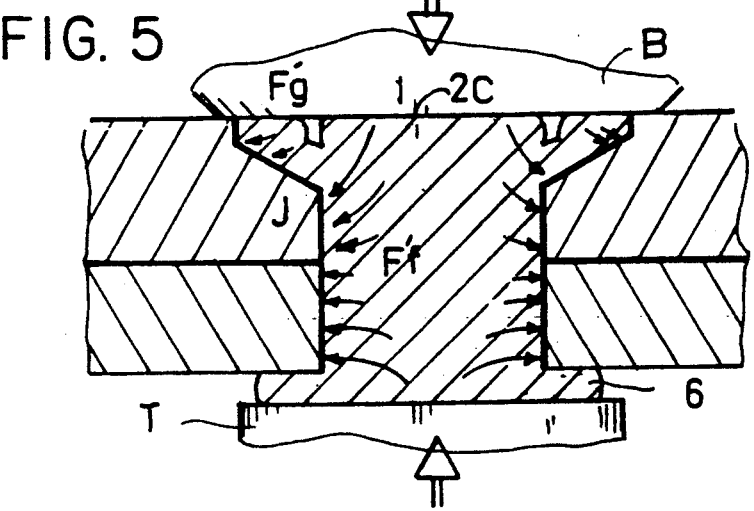

The installation of the above-described rivet is illustrated in FIGS. 3, 4, and 5 and comprises introducing the rivet into a hole in the metal sheets, in such a manner that its shank 1 passes through the bore 3 of the hole and extends by the end opposite the head, and with the head 2 being positioned in the recess 4 of the hole (FIG. 3).

A backup plate B and an anvil T, both of which are conventional, then permit flattening of the head 2 and forming of a second head 6 at the end of the shank of the rivet. The flattening of head 2 takes place in two phases: one phase of pre-flattening (FIG. 4) in which the backup plate flattens the peripheral portion 2P of the head and is not yet in contact with the central portion 2C. This peripheral portion, separated from the central portion 2C by groove 5, undergoes an essentially radial enlarging illustrated by the arrow Fg.

Next the backup plate B comes into contact with the central portion 2C and likewise flattens it (FIG. 5); the enlargement of the peripheral portion 2P continues (arrow F'g), while the central portion 2C undergoes an axial-radial flow (arrow F'f) which generates an expansion at the level of junction zone J between shank and head of the rivet and in the shank. The second head 6 is formed simultaneously on the other side of the shank.

Figure 7:
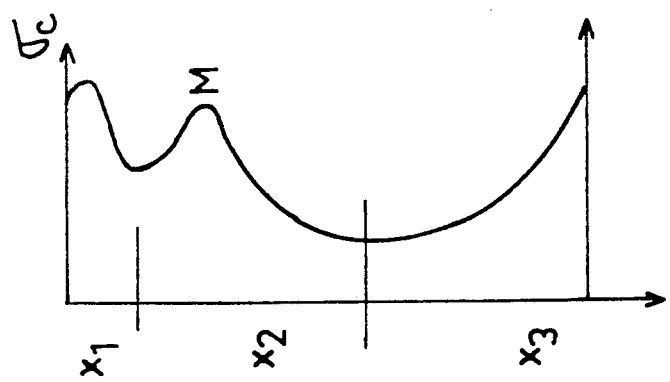
FIG. 6 is a cross-section of the assembly obtained and FIG. 7 is a diagram of the compressive forces between the metal sheets and the rivet.
Figure 6:
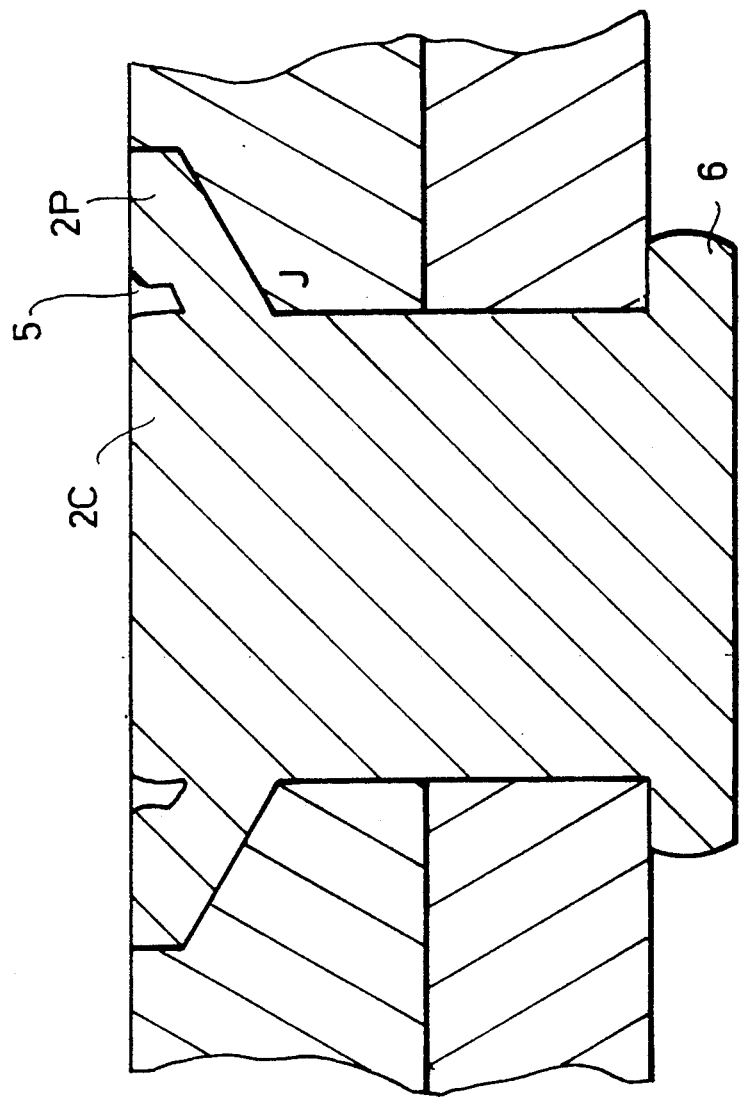

FIG. 6 shows in cross-section the assembly obtained, FIG. 7 showing the distribution of the radial compressive forces $\sigma_c$ between the metal sheets and the rivet. One can distinguish three zones in which the compressive forces are due to different phenomena: a zone $x_1$ (near the rim of the head) in which the compression forces are essentially due to the enlargement of the peripheral portion 2P, a zone $x_2$ (near the head/shank junction) in which the compression forces are essentially due to the flow of the central portion 2C and to its expansion, these forces going through a maximum M in this zone, and a zone $x_3$ in which the forces are essentially due to the enlargement of the head during the formation of the second head.

We claim:

1. A fastener for the production of assemblies including an axial shank (1) for placement in a hole in the materials to be assembled, and a head (2) situated at an end of said shank for deformation by flattening during installation, said head comprising a front face having an annular groove (5) formed therein and extending around the axis of said axial shank, said annular groove being positioned on said front face in proximity to the alignment of the exterior surface of the shank (1) and defining on the head two portions, a central portion and a peripheral portion (2P), for deformation independently under the effect of flattening.

2. A fastener as in claim 1, and wherein said annular groove (5) has a depth (p) adapted to define in the head a zone of reduced thickness (Zm) between the bottom (5b) of the groove and the base of the head, the two portions, central (2C) and peripheral (2P), of independant deformation being situated on opposite sides of the zone of reduced thickness.

3. A fastener as in one of claim 1 and wherein said annular groove (5) is formed in the front face of the head in such a manner that its internal edge (5a) is located on a circumference of diameter $d_l$ such that $d_l = d_r \pm 0.3\, d_r$ where is the diameter of the shank.

4. A fastener as in claim 1 comprising a rivet adapted to be inserted in a hole having at one end a wall in which the head (2) of the rivet has a cylindrical rim (2a).

5. A rivet as in claim 4, made of a light aluminum alloy, and wherein ratio of the depth (p) of the groove (5) to the height (h) of the head is between 0.1 and 0.5.

6. A rivet as in claim 4 and wherein said front face of the head (2) has two levels, one corresponding to the central portion (2C) and recessed in relation to the other level corresponding to the peripheral portion (2P).

7. A rivet as in claim 6, and wherein, on the frontal surface of the head, the difference ($\Delta$) in level between the central recessed portion (2C) and the peripheral portion (2P) is essentially between 0.05 mm and 0.2 mm.

8. A rivet as in one of claims 4, 5, 6, or 7 in which the peripheral portion (2P) of the head is of the raised half-flat type ($2P_1$, $2P_2$).

9. A rivet as in claim 5, and wherein the width -e- of the groove (5) comprises essentially between $0.08\, d_r$ and $0.12\, d_r$ where $d_r$ is the diameter of the shank.

10. A rivet as in claim 4, in which the groove (5) of the head has a bottom (5b) of essentially semi-circular cross-section and sides (5c) opening in a slight relief angle toward the front face.

11. A process for assembling materials comprising forming in said materials a hole having a bore (3) opening on one side by a wall (4a), introducing into said hole a rivet having on one end a head (2b) having a cylindrical rim (2a) adapted to fit into the wall of the hole, on the other end an axial shank (1) adapted to fit in the bore and extending on the side opposite the head, and flattening said head while forming at the other end of the shank of the rivet a second head (6), introducing into the hole a rivet the head (2) of which has a front face provided with an annular groove (5) positioned in proximity to the alignment of the exterior surface of the shank (1) in order to define on said head a central portion (2C) and a peripheral portion (2P), capable of being deformed independently, flattening said head by pressure on the front face so as to cause the peripheral portion (2P) to swell into the wall (4a), and to cause the central portion (2C) to deform toward the junction zone (J) between shank and head and toward the shank and to compress the materials to be assembled into said zones.

12. An assembly process as in claim 11, said rivet:

having a shank (1) of diameter -$d_r$- less than that -$d_r$- of the bore of the hole, so as to establish a clearance of not more than 0.1 mm between shank and bore, having a head (2b) countersunk at an angle corresponding to that of a countersink (4) of the hole, with a rim of a diameter -$D_r$- less than that -$D_r$- of the wall (4a) of the hole so as to establish a clearance of not more than 0.5 mm between head and wall, in which the front face of the head (2) has in its central portion (2C), a level projecting above by a distance $\Delta_1$ the surface of the materials to be assembled, and in its peripheral portion (2P), a level projecting above by a distance $\Delta_2$ said surface, such that $0.2\text{ mm} \leq \Delta_2 \leq 0.5\text{ mm} \leq \Delta_2 - \Delta_1 = \Delta \leq 0.2\text{ mm}$.

13. An assembly process as in claim 11, and wherein said rivet having on the front face of its head an annular groove (5) arranged in such a way that its internal edge (5a) is located on a circumference of diameter $d_1$ such that $d_1 = d_r \pm 0.15\, d_r$ where $d_r$ is the diameter of the shank.

14. An assembly of materials obtained by carrying out the process of claim 11.

* * * * *